June 7, 1966 L. Q. SPILLER 3,254,754
HARVESTING APPARATUS
Filed April 20, 1964 2 Sheets-Sheet 1
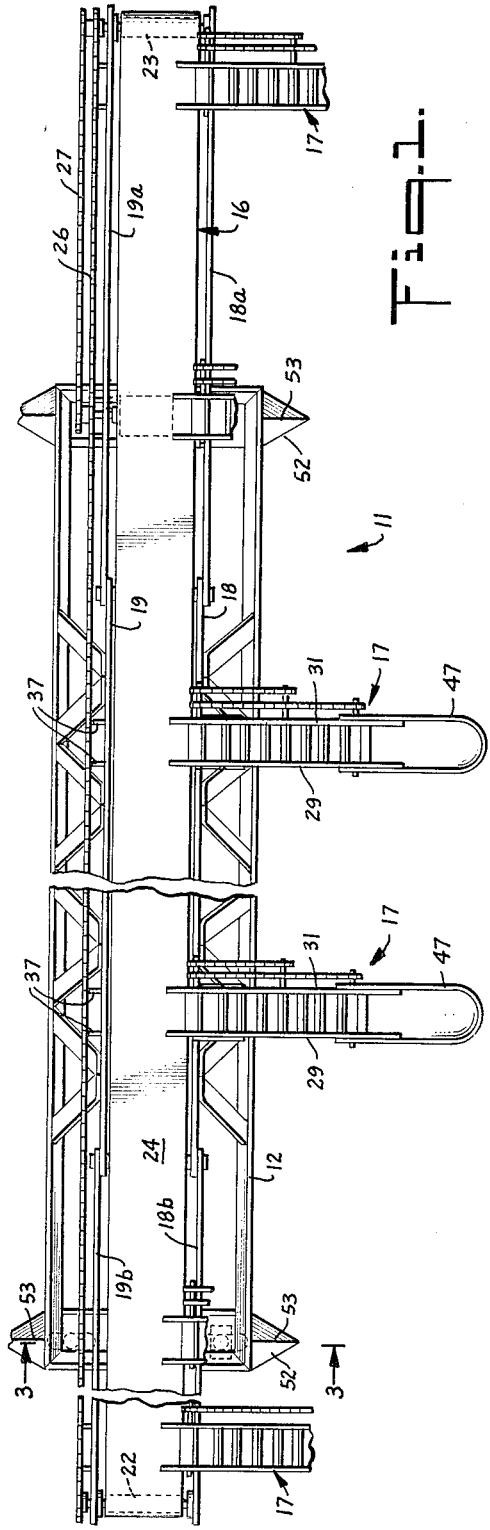
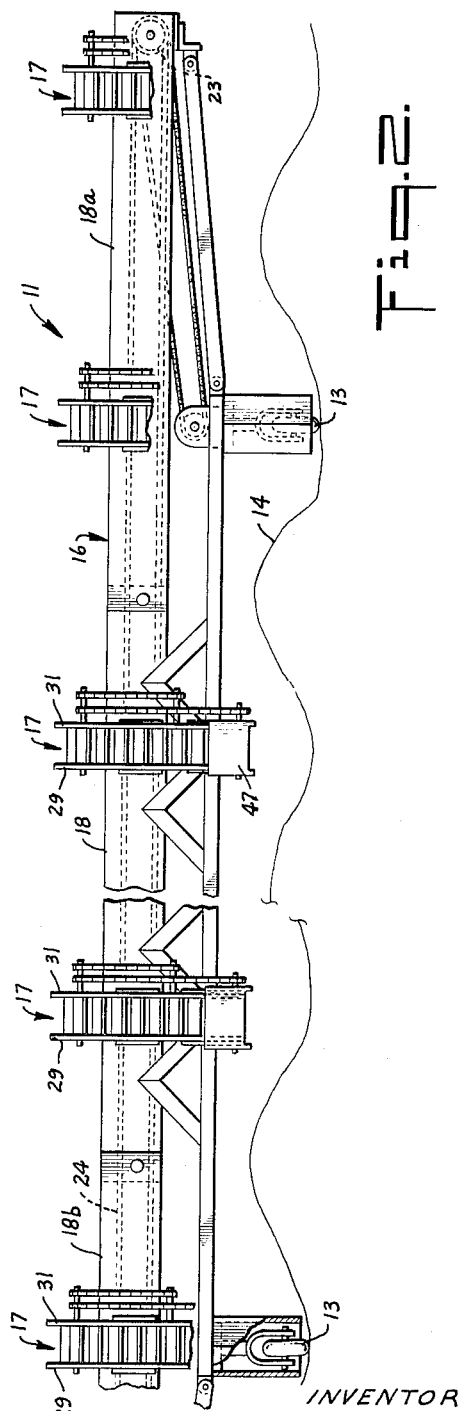
INVENTOR
LOUIS Q. SPILLER
BY
Gardner + Zimmerman
ATTORNEYS June 7, 1966  L. Q. SPILLER  3,254,754
HARVESTING APPARATUS
Filed April 20, 1964  2 Sheets-Sheet 2

INVENTOR
LOUIS Q. SPILLER
BY
Gardner & Zimmerman
ATTORNEYS

United States Patent Office 3,254,754
Patented June 7, 1966

3,254,754
HARVESTING APPARATUS
Louis Q. Spiller, Hayward, Calif., assignor to Spiller Harvest Machinery & Co., Hayward, Calif., a partnership
Filed Apr. 20, 1964, Ser. No. 361,156
6 Claims. (Cl. 198—79)

This invention relates generally to harvesting machines, and more particularly to a semi-automatic harvesting machine for use with low growing produce which is hand picked by laborers and deposited in the machine.

Harvesting of produce such as tomatoes, cucumbers, and the like, most commonly is performed simply by laborers who hand pick the produce, pack them in crates, and carry the crates to loading areas where they are subsequently transported from the fields by truck. Although the disadvantages in this harvesting procedure are apparent, from the standpoint of both labor and time involved, there has not heretofore been provided a commercially successful harvesting apparatus requiring manual labor only for the initial step of picking the produce.

One disadvantage in some prior harvesters has been found insofar as they are cumbersome and difficult to maneuver in the field. In this regard, many harvesters require a substantial clearing or unplanted area in which to turn at the end of a planted area in order to be positioned for traversing the next planted area to be harvested. A further disadvantage with prior harvesters used in conjunction with laborers for picking the produce is that only a small number of laborers can be used and must pick over a relatively large area, thus resulting in a relatively slow rate of harvesting. Also, the laborers often are not afforded optimum conditions under which they must pick the produce and deposit it in the harvesting machine.

Accordingly, it is an object of the present invention to provide semi-automatic harvesting apparatus which enables the produce hand picked by a large number of laborers to be accumulated and conveyed to a single specified location for crating or otherwise being packaged.

A further object of the present invention is to provide harvesting apparatus of the type described which requires only a relatively small area to be maneuvered in for positioning to traverse an unpicked planted area. In this regard, an object of the invention is to enable the harvesting apparatus to be moved laterally at the end of a planted area so that it can be returned in the opposite direction without having to maneuver the apparatus in a complete 180 degree turn.

Another object of the invention is to provide harvesting apparatus which is adjustable for suitable receipt of varying types of produce which for example may include articles as small as grapes or as large as lettuce.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a top plan view of a harvester embodying the present invention, with portions being broken away.

FIGURE 2 is a rear elevation view of the harvester shown in FIGURE 1.

Figure 3:
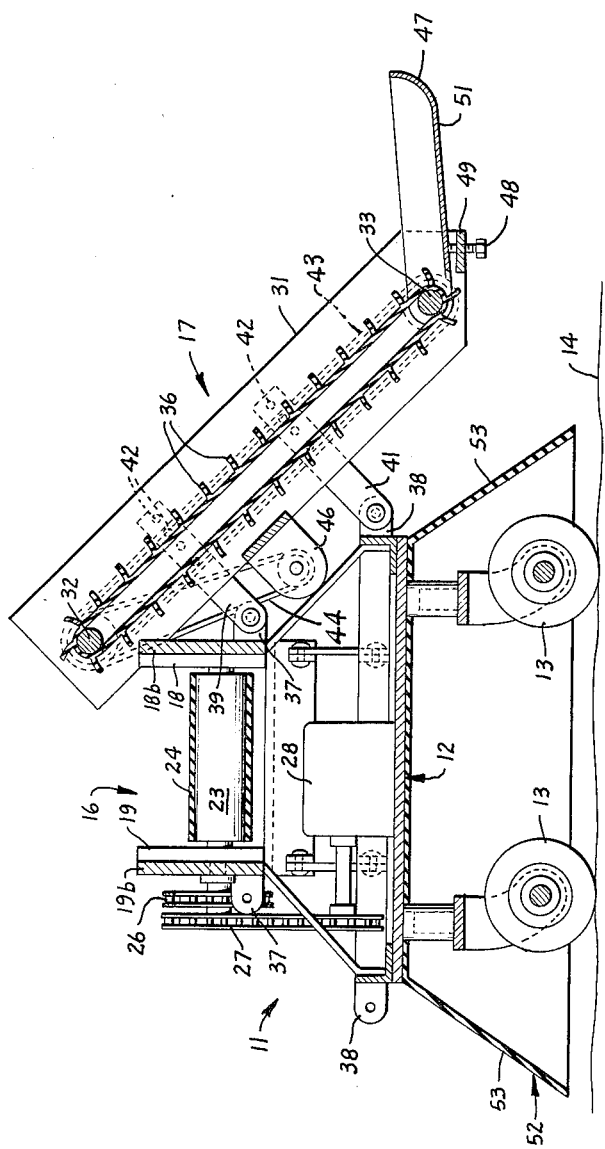
FIGURE 3 is a cross sectional side elevation view taken along the plane 3—3 as shown in FIGURE 1.

Illustrated in the drawings is a harvester 11 embodying the present invention, which generally includes an elongated base structure 12 and ground engaging means such as the caster wheels 13 which support the base in overlying spaced relation to a ground surface 14 and enable its movement thereon. First conveyor means such as the conveyor 16 is provided for conveying articles longitudinally along the base 12 toward one end thereof. A plurality of second conveyor means, such as the elevator conveyors 17, are mounted on the base 12 at longitudinally spaced positions thereon for conveying articles from positions adjacent the ground 14 onto the first conveyor 16.

Considering the harvester now in more detail, the base structure 12 is seen to include a pair of longitudinally extending upstanding side walls 18 and 19 which define a longitudinal channel in which is disposed the first conveyor assembly 16. The side walls 18 and 19 respectively include pivotally mounted end members 18a, 18b and 19a, 19b, each of which are pivotable in a vertical plane parallel to the respective walls 18 and 19. Brace members 21 are secured respectively between the base 12 and the ends of each of the end members 18a, 18b, 19a and 19b for supporting them in the position illustrated. By disconnecting one end of each brace member, or by constructing the brace member with a telescoping hydraulic piston portion (not shown), it is possible to pivot the four end members upwardly to reduce the over-all span of the harvester. With the harvester in fully extended position as shown, it may span distances as large as 70 feet, and thus by being able to collapse the end portions, if desired, it is possible to facilitate travel of the harvester along roads when not in operative use.

The conveyor 16 as shown includes a pair of drive pulleys 22 and 23 rotatably mounted adjacent the opposite ends of the base 12 between corresponding side walls thereof, with an endless conveyor belt 24 being mounted around the respective pulleys for operation thereby. A drive chain 26 synchronously couples the pulleys 22 and 23, while a drive chain 27 as shown couples power from a motor 28 to the drive pulley 23. The chain 26 provides a constant equal drive of the belt 24 at both ends thereof. The motor 28 is suitably adapted to reverse rotation thereof, whereby the conveyor belt 24 may be driven in either direction.

With regard to the elevator conveyors 17, it is noted that each of them is disposed generally tranversely relative to the conveyor 16, and is inclined upwardly toward the conveyor 16. Each elevator conveyor 17 includes a pair of spaced side walls 29 and 31, with upper and lower drive pulleys 32 and 33 journalled for rotation therebetween. An endless conveyor belt 34 is disposed on the pulleys 32 and 33 for operation thereby, and includes longitudinally spaced scoop members 36 for carrying articles upwardly toward the conveyor 16. It is preferred that the members 36 be constructed of a relatively soft flexible or resilient material to assure that the produce is not injured in the harvesting operation.

Mounting means such as a pair of brackets 37 and 38 are provided on each side of the base 12 at longitudinally spaced positions thereon, to enable mounting of the elevator conveyor 17 on either side of the conveyor 16 for purposes to be described hereinafter. Each of the elevator conveyors 17 is seen to include a pair of bracket members 39 and 41 secured to each of the side walls 29 and 31, the brackets 39 and 41 being respectively mountable on the base brackets 37 and 38 by means of suitable fasteners such as nuts and bolts. The brackets 39 and 41 are provided respectively with a plurality of mounting holes 42 by means of which they are secured to the side walls 29 and 31. Corresponding holes are provided in the side walls for their securance to the brackets 39 and 41 by means of nut and bolt fasteners. By selecting the proper hole 42 it is possible to adjust the angle of inclination of the conveyor 17, and accordingly the height of the lower end of the elevator conveyor from the ground surface 14.

A drive chain 43 synchronously connects the upper and lower drive pulleys 32 and 33, and a drive chain 44 couples the drive pulley 32 of each conveyor 17 to a corresponding motor 46 which serves to operate the elevator conveyor.

A trough 47 is secured adjacent the lower end of each elevator conveyor 17, and is pivotally mounted thereon. Adjustment means such as the screw 48 extending vertically in a cross piece 49 between the side walls 29 and 31 engages the bottom wall 51 of the trough 47, and variation in the height of the screw 48 adjusts the angle of inclination of the trough wall 51.

As more particularly regards the caster wheels 13, it is noted that in the disclosed embodiment four casters are provided and are disposed in transversely aligned pairs longitudinally spaced on the base 12. A skirt member 52 is secured to the base adjacent each pair of casters and generally encloses or surrounds them in protective relation so as to prevent engagement of the caster wheels with straggling branches of shrubs that might extend into the path of the wheels. Preferably, the skirt member includes inclined leading edges 53 as shown, and is constructed of a flexible resilient material such as rubber or the like so that it will not sever or bruise the crops.

In operating the harvester 11 the base 12 is aligned transversely relative to furrows in the planted field, with the wheels 13 disposed in the furrows, and a suitable draft vehicle or other means is provided to move the harvester along the furrows. Two laborers are stationed on opposite sides respectively of each elevator conveyor and corresponding trough, and hand pick the produce and deposit it in the trough. The elevator conveyor engages and transports the produce from the trough 47 upwardly and deposits it on the conveyor belt 24, which in turn transports the produce from all the elevator conveyors longitudinally along the harvester toward one end thereof. A flat bed truck, for example, may be positioned along one end of the harvester and moved along therewith, with the produce from the conveyor 16 being received on the truck and suitably crated or packaged.

An important feature of the invention relates to the maneuverability of the harvester with regard to positioning it at the end of a planting area for a run in the opposite direction across an unpicked planted area. In this regard, when the harvester reaches the end of a given crop area, it is not necessary to turn the harvester 180 degrees in order that it be returned along a parallel path of unpicked crops. Instead, the caster wheels 13 enable the harvester to be moved in a simple manner longitudinally relative to the body, that is transversely to the furrows, until it is positioned for the return run. The elevator conveyors 17 are then removed from one side of the harvester and mounted on the other side thereof, whereupon the harvester is ready for the return run. As a result of the foregoing operation, it is necessary to provide only a relatively narrow unplanted area at the end of each planted area, as for example an area of about ten feet in width. If it were necessary to make a full 180 degree turn of the harvester, it will be appreciated that an unplanted area having a width in excess of 70 feet would be necessary. Thus, the instant harvester is seen to enable more planted area to be utilized. Further in this regard, it may be desirable to provide a relatively narrow access road for the aforesaid flat bed truck to move along on the end of the harvester. Such roads might be laid out so that for the first run the road is adjacent one end of the harvester, and for the return run the road is adjacent the other end of the harvester. In order to convey the harvested produce to the loading station in either situation, the conveyor 16 is simply reversed in direction so that the produce can selectively be conveyed toward either end of the harvester as may be desired.

As further regards the elevator conveyor 17 and trough 47, it is noted that the above described adjustment of the trough 47 can be made to vary the angle of inclination of the bottom wall of the trough. In this regard, it will be seen that the trough can thereby be made to accommodate different types of produce having different characteristics. More particularly, it is necessary to have a greater trough inclination for articles such as grapes than it is for articles such as tomatoes, so that in either case it is assured that the conveyor 17 readily transports the produce from the trough upwardly towards the conveyor 16. Further, it is noted that by adjusting the height of the conveyor 17 from the ground it is similarly possible to accommodate different types of produce with regard to their growing height. Thus, the trough and elevator conveyor can be raised to sufficiently clear somewhat higher growing crops when necessary.

What is claimed is:

1. Harvesting apparatus of the type described comprising, in combination, a generally elongated base structure, ground engaging means for supporting said base over a ground surface for moving said base thereon, said ground engaging means including a plurality of caster wheels which allow movement of said base in both longitudinal and transverse directions, first conveyor means for conveying articles longitudinally along said base toward one end thereof, and a plurality of second conveyor means each mounted on said base at longitudinally spaced positions thereon for conveying articles from positions adjacent the ground onto said first conveyor means, further including means for selectively mounting said second conveyor means on either side of said base for conveying articles onto said first conveyor means from either side thereof.

2. Apparatus as described in claim 1, wherein said first conveyor means is selectively reversible in direction to convey articles toward either end of said base.

3. Harvesting apparatus of the type described comprising, in combination, a generally elongated base structure, a plurality of caster wheels secured to said base for supporting same in spaced overlying relation to a ground surface and for moving said base in any direction thereon, a first conveyor assembly mounted on said base and extending longitudinally thereon substantially the full length thereof, said conveyor being selectively movable in opposite directions for conveying articles toward either end of said base, a plurality of second elevator conveyor assemblies each removably mounted on one side of said base at longitudinally spaced positions thereon, said elevator conveyors each extending generally transversely to and being inclined upwardly toward said first conveyor for transporting articles from adjacent the group upwardly onto said first conveyor from one side thereof, means provided on the other side of said base for removably mounting said elevator conveyors at longitudinally spaced positions thereon for transporting articles onto said first conveyor from the other side thereof.

4. Apparatus as described in claim 3 further including a plurality of troughs each mounted adjacent the lower end of one of said elevator conveyors for retaining articles to be picked up and conveyed upwardly by said elevator conveyors.

5. Apparatus as described in claim 4 further including a skirt member mounted on said base and generally enclosing at least one of said wheels for restricting the latter against engagement with low growing foliage disposed in the path of said wheel.

6. Apparatus as described in claim 5 wherein said first conveyor includes drive pulleys disposed adjacent the opposite ends of said base, an endless conveyor member mounted on said pulleys, and means for synchronously driving both of said pulleys to operate said conveyor member, each of said elevator conveyors including upper and lower drive pulleys, a conveyor member mounted on said latter drive pulleys and including flexible resilient scoop members for engaging articles retained in said trough and carrying them upwardly toward said first conveyor, and drive means for synchronously driving said upper and lower drive pulleys, said skirt being constructed of a flexible resilient material, and means being provided for adjusting the angle of inclination of the bottom wall of said troughs toward said corresponding elevator conveyors.

References Cited by the Examiner

UNITED STATES PATENTS

| | | | |
|---|---|---|---|
| 2,267,234 | 12/1941 | Garber | 214—83.1 |
| 2,357,549 | 9/1944 | Roberson | 214—83.1 X |
| 2,395,124 | 2/1946 | Jelderks | 214—83.1 |
| 2,562,539 | 7/1951 | Ellis et al. | 214—83.26 X |
| 2,590,965 | 4/1952 | Huston | 214—83.1 X |
| 2,768,730 | 10/1956 | Brakhage | 198—118 |

GERALD M. FORLENZA, *Primary Examiner.*